INVENTOR.
EDGAR M. TOMPKINS

United States Patent Office 3,432,232
Patented Mar. 11, 1969

3,432,232
ILLUMINATION SYSTEM
Edgar M. Tompkins, Rochester, N.Y., assignor to Xerox Corporation, Rochester, N.Y., a corporation of New York
Filed Oct. 21, 1965, Ser. No. 500,145
U.S. Cl. 355—8                           1 Claim
Int. Cl. H01j *17/22;* G01d *15/14*

ABSTRACT OF THE DISCLOSURE

An illumination control system for a xerographic reproducing apparatus wherein a vapor control center within a fluorescent lamp which maintains proper pressure therein is heated by a heating element which maintains the vapor control center at a given temperature when the lamps are de-energized.

---

This invention relates to the field of illumination and in particular, to a system for controlling illumination of a document during scanning thereof in a reproduction device such as a xerographic reproducing apparatus.

The circuit for illuminating the document during scanning thereof is particularly adapted for use with xerographic apparatus such as that disclosed in Eichorn et al. Patent No. 3,099,943 issued Aug. 6, 1963. In that apparatus, copies of original documents are made at varying intervals throughout a working day. With apparatus that is repeatedly in use, it is desirable that the machine be in optimum condition for immediate use and to remain in optimum condition throughout the working periods.

Heretofore, it has been necessary to either wait longer periods of time prior to having the machine in its optimum condition for illuminating the original document or it has been necessary to maintain the illumination system in a low or full power condition during non-operating periods and switching to a higher or overpowered condition during the actual scanning operation of the machine.

In the present invention, a particular system is devised for energizing the illumination lamps of an office copier or reproduction apparatus of the type employing the principles of xerography. The lamps are of the fluorescent type for illuminating a document during scanning thereof by a suitable optical system. The light rays emanating from the document during scanning are projected by an optical system onto the surface of a xerographic plate. In order to provide as much light as possible for this purpose, the system for the present invention is designed to control preheating of a vapor control center within the lamp thus achieving maximum lumen in a minimum amount of time during the scanning period of a document.

In addition, to minimize the time for conditioning the xerographic apparatus for scanning purposes, the system is devised so that the vapor control center is initially preheated to near optimum operating temperature during the standby condition. The preheating dispenses the vapor into the arc stream to maintain a specified vapor pressure within the lamp. When the lamp is energized they will achieve their maximum lumen in a minimum amount of time.

Therefore, it is an object of the present invention to control the temperature and thus the vapor pressure within the exposure lamps in a reproduction apparatus so that optimum lighting is achieved in a minimum amount of time for the illumination of a document being reproduced.

Another object of the invention is to produce optimum lighting conditions in a reproduction apparatus in a minimum of time thereby permitting use of apparatus in a minimum of time and without loss of illumination efficiency during the early stages of each reproduction run.

A further object of this invention is to improve the illumination system of reproduction apparatus, so that a nearly constant lumen output can be attained.

These and other objects of the invention are attained by means of an illumination system that has mounted therein a lamp with vapor therein. The system includes a vapor control center and a device for controlling the temperature thereof.

For a better understanding of the invention, as well as other objects and further features thereof, reference is had to the following detailed description of the invention to be read in connection with the accompanying drawings, wherein.

Figure 1:
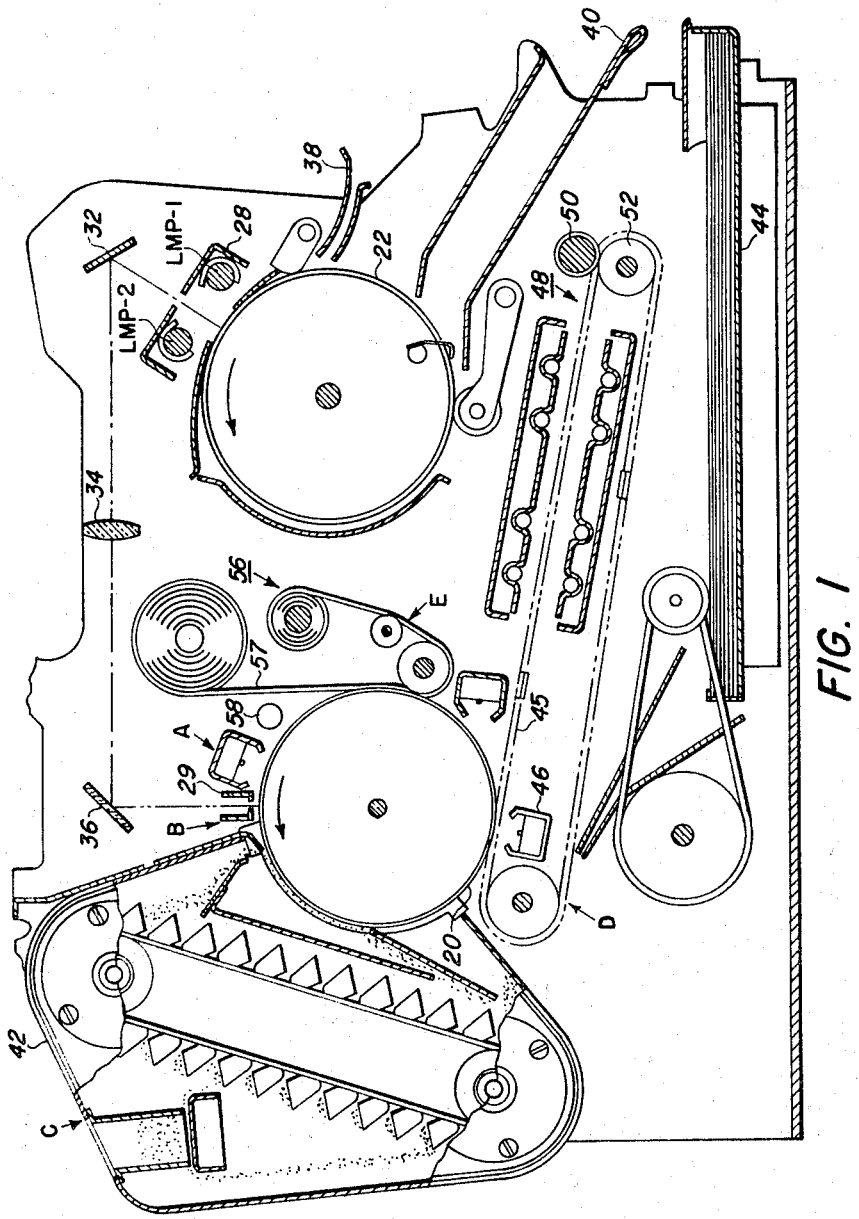
FIG. 1 is a schematic illustration of an apparatus employing the invention.
Figure 2:
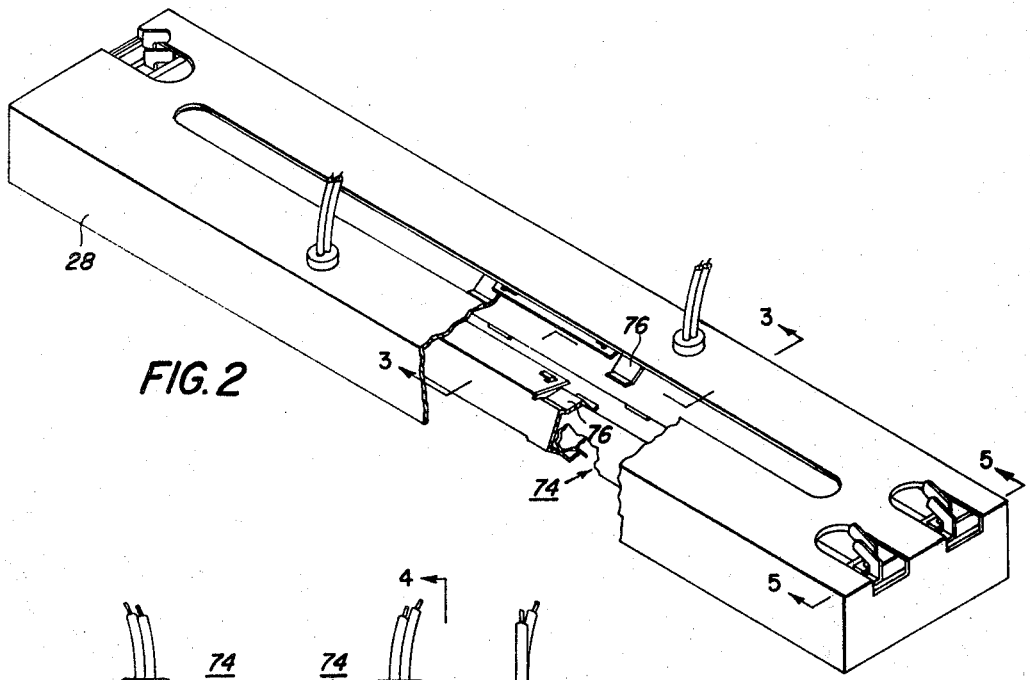
FIG. 2 is a perspective view of illumination system with parts broken away.
Figure 3:
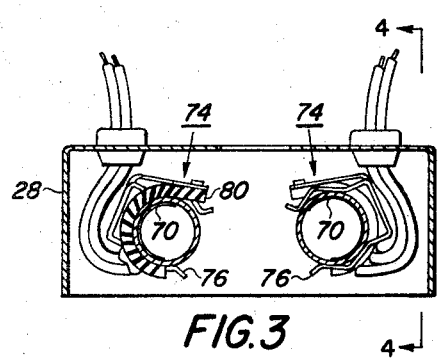
FIG. 3 is a sectional view taken along line 3—3 of FIG. 2.
Figure 4:
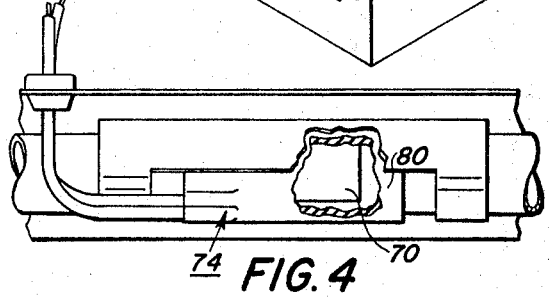
FIG. 4 is a partial sectional view taken along line 4—4 of FIG. 3.

Now referring to the drawings there is shown in FIGURE 1, a xerographic apparatus comprising a xerographic including a photoconductive layer or light receiving surface on a conductive backing and formed in the shape of a drum 20 which is journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally as follows:

A charging station at which a uniform electrostatic charge is discharged on the photoconductive layer of the xerographic drum;

An exposure station at which a light pattern of copy to be produced is projected onto the drum surface to dissipate the drum charge in the exposed areas thereof and thereby form a latent electrostatic image of the copy to be reproduced;

A developing station at which a xerographic developing material including toner particles having an electrostatic charge opposite to that of the electrostatic latent image is cascaded over the drum surface whereby the toner particles adhere to the electrostatic latent image to form a xerographic powder image in the configuration of the copy to be reproduced;

A transfer station at which the xerographic powder image is electrostatically transferred from the drum surface to a transfer material shield support material; and, A drum cleaning station at which the drum surface is first charged and then brushed or wiped to remove residual toner particles remaining thereon after image transfer, and at which the drum surface is exposed to a relatively bright light source to effect substantially complete discharge of any residual electrostatic charge remaining thereon.

The charging or corona charging device 21 includes a corona discharge array of one or more discharge electrodes which extend transversely across the drum surface and are energized from a high potential source and are substantially enclosed within a shielding member.

The optical scanning or projection assembly consists of a copyboard in the shape of a drum hereinafter referred to as copy drum 22 which is attached to support a copy to be reproduced and arranged to rotate in light projection relation to the moving light receiving source of a xerographic plate. Uniform lighting is provided by suitable lamps 26 mounted within a slotted light reflector 28 arranged adjacent the copy drum. A slotted light shield 29 adapted to protect the xerographic plate from extraneous light is positioned adjacent the surface of the xerographic plate. A slotted aperture 31 in the light shield extends transversely to the path of movement of the light receiving surface of the xerographic drum 20 to permit reflected rays from the copy drum to be directed against a limited transverse area of the light receiving surface as it passes thereunder. The optical system for the xerographic apparatus comprises an object mirror 32, a lens 34 and image mirror 36. A document fed through document guides 38 through the copy drum 22 is removably secured thereon by suitable means for movement therewith in timed relation to the movement of the xerographic drum 20, whereby a flowing image of copy is projected by the optical system onto the xerographic drum. After the copy is scanned, it is released from the copy drum to be transported out of the machine document feedout guide 40.

Adjacent the exposure station is a development station upon which there is positioned a development apparatus 42 containing developer material which is made to adhere electrostatically to the previously formed electrostatic latent image area on the drum 20 to form a suitable xerographic powder image.

Positioned next adjacent to the developing station is the image transfer station D which includes a suitable sheet feeding mechanism adapted to feed sheets of paper successively to the xerographic drum in coordination with the presentation of the developed image on the drum at the transfer station. The sheet feeding mechanism includes a sheet source such as paper tray 44 for a plurality of sheets of a suitable material that is out of paper or the like and other suitable devices such as conveyor 45 which carries the sheet of support material into contact with the rotating xerographic drum in coordination with the appearance of a developed image at the transfer station. The details of this mechanism are adequately disclosed in the above referred to patent to Eichorn et al.

The transfer of the xerographic powder image from the drum surface to the support material is effected by means of a corona transfer device 46 that is located at or immediately after the point of contact between the support material in the rotating xerographic drum which occurs between the conveyor 45 and the drum 20. The corona transfer device 46 is substantially similar to the corona discharge device that is employed in the charging station in that it also includes an array of one or more corona discharge electrodes that are energized from a suitable high potential source and extend transversely across the drum surface and are substantially enclosed with a shielding member. After transfer of the powder image to a sheet of material the supported material is stripped from the xerographic drum by any suitable means and carried to a fixing device, such as for example, heat fuser 48 whereat the developed and transferred xerographic powder image on the support material is permanently affixed. After fusing, the finished copy is discharged from the apparatus to a pair of delivery rolls 50 and 52.

The next and final step in the device is a drum cleaning station E whereat any powder remaining on the xerographic drum after the transfer step is removed and whereat the xerographic drum is flooded with light to cause dissipation of any residual electrical charge remaining on the xerographic drum. Removal of the residual powder from the xerographic drum is effected by means of a web cleaning device 56 adapted to continuously feed a clean fibrous web material 57 into close contact with the xerographic drum. Any residual electrical charge remaining on the xerographic drum is dissipated by light from the fluorescent lamp 58 mounted in a suitable bracket above a xerographic drum a suitable starter and ballast being provided for energizing the fluorescent lamp. Suitable drive means drive the xerographic drum, the copy drum, the sheet feeding mechanism at predetermined speeds relative to each other, and effect operation of the web cleaning mechanism being driven at a speed whereby relative movement between the xerographic drum and the web material is effected.

As the document is brought to the copying station as defined by the slotted light reflector 28 successive portions of the document are uniformly illuminated by lamps LMP-1 and LMP-2. As shown in the electrical schematic wiring diagram of FIGURE 7, a pair of fluorescent lamps LMP-1 and LMP-2 are used to illuminate the copy.

Figure 7:
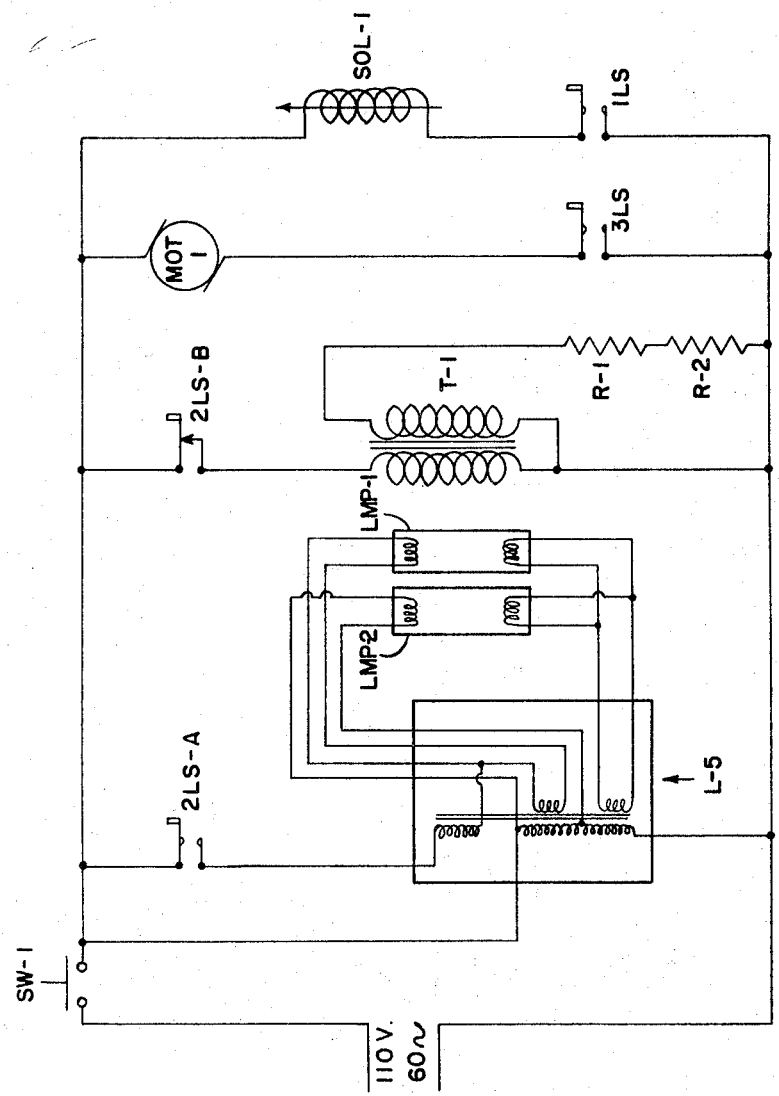
FIG. 7 is a schematic circuit wiring diagram of the illumination system.

When the machine is first turned on, usually early in the day, the switch SW-1 is actuated thus placing the machine in a standby condition. Thus, the step down transformer T-1 is energized the purpose of which is described below, and the primary of L-5 energized, supplying power to heat the lamp filaments, while the remaining components in the circuit shown in FIG. 7 are in a standby condition.

The xerographic drum, the copy drum, and the fourth conveyor mechanism suitably geared are rotated by a main drive motor MOT-1. In making a single reproduction, the document is inserted into the machine through the guide 38 and is supported upon the copy drum 22 to be rotated therein. As the document is inserted in the document guide its leading edge will actuate switch 1-LS positioned beneath the document guide with its actuator extending through a suitable aperture in the document guide to thereby close its contact to complete a circuit to initiate operation of the machine.

To receive the image of the document reflected through the light reflector there is provided an object mirror 32 which reflects light through the lens 34. An image mirror 36 is positioned in the light path from the lens to reflect the image onto the xerographic drum through the slot aperture of the light shield 29. The lens 34 and the two mirrors are preferably secured to an optical mounting device supported on the frame of the xerographic apparatus. Suitable light baffles, not shown, are secured to the underside of the optical mounting device to shield the lens 34 from extraneous light.

The slotted light shield 29 is simply an open elongated box, the bottom wall of which is a narrow slot aperture 31 extending across its length. The light shield may be suitably mounted on the xerographic frame or the optical mounting device.

Now, as the xerographic drum 20 rotates under the corona charging device at station A, a uniform electrostatic charge is deposited on the photoconductive layer of the drum. As the xerographic drum rotates through the exposure station a light pattern of the copy carried on the rotating drum 22 is projected by means of the mirrors and lens assembly 32, 36, 34 which has been previously described, onto the surface of the drum to deposit the charge in accordance with the light pattern of the copy thereby forming a latent electrostatic image of the copy on the xerographic drum.

The exposed portion of the drum then rotates through developing station C where a xerographic developing material including toner particles having an electrostatic charge is cascaded over the drum surface whereby the toner particles adhere to the electrostatic latent image to form a xerographic powder image in the configuration of the copy. The exposed and developed portion of the xerographic drum then advances to the image transfer station D or it receives a sheet of support material and is transported into contact with drum 20. As the drum surface in the sheet of support material passes over the corona transfer device 46, the developed powder image is transferred electrostatically from the xerographic drum surface to the sheet of support material. The xerographic drum then continues to rotate to the web cleaning device 56 whereby any residual powder on the drum surface is removed by the web 57, and then under the discharge lamp 58 whereat any residual charge on the drum is dissipated by radiation from the lamp.

In the meantime, the copy drum is rotated at a corresponding rate of speed whereby it is then ready to receive the second document or if the copy is to be retained on the copy drum, it is ready to be advanced through the exposure station again. Assuming that only a single reproduction of a single copy is being made the copy will have been ejected from the machine and the xerographic powder image will be transferred to the sheet of support material during the one cycle or rotation of the xerographic drum or copy drum.

At the scanning station as determined by the reflector 28 the exposure for the xerographic drum 20 are energized, that is the fluorescent lamps LMP–1 and LMP–2 are energized through the circuit consisting of ballast L–5. The lamps LMP–1 and LMP–2 are energized when the switch 2–LSA is closed.

This is accomplished by means of a mechanically operated fly back cam which is actuated by solenoid SOL–1. Solenoid SOL–1 is actuated when limit switch 1–LS is actuated as a sheet of paper is inserted thereby closing switch 1–LS. The fly back cam closes the normally opened switch 2–LSA and 3–LS and opens the normally closed switch 2–LSB. After the document has been scanned, that is, after the copy document has rotated past the scanning station, the cam will reverse the positions of switches 2–LSA and 2–LSB and opens 3–LS. This brings the switch 2–LSA back to its normally opened position and the switch 2–LSB back to its normally closed position. Thus, the switch 2–LSA opens de-energizing the lamps and switch 2–LSB closes energizing step down transformer T–1. The opening of 3–LS will shut down the motor MOT–1. The opening of 3–LS is timed to occur after the copies have been made and the original leaves the machine.

Each of the lamps LMP–1 and LMP–2 is provided with a patch of a mercury gathering material preferably indium on the interior thereof. When this indium patch 70 is heated the mercury will be dispersed or released as a vapor into the arc stream. When the heat is removed from the spot, it then cools and gathers mercury again. Thus, the spot serves as a vapor control center within the lamp to maintain a specified vapor pressure within the lamp which controls the lumen output of the lamp.

Figure 5:
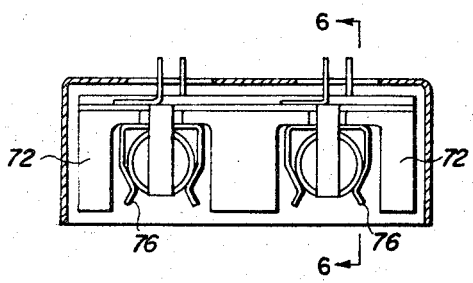
FIG. 5 is a sectional view taken along line 5—5 of FIG. 2.
Figure 6:
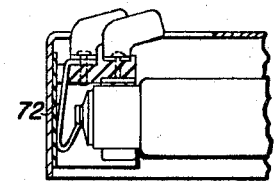
FIG. 6 is a sectional view taken along line 6—6 of FIG. 5.

The lamps LMP–1 and LMP–2 are mounted in the reflector 28 by means of clamping contacts 72 which are connected to the ballast as shown in FIGURE 5. Two heating element units 74 are clamped to the lamps adjacent the indium spot by means of prongs 76.

The switch 2LSB is closed as the lamps LMP–1 and LMP–2 are de-energized by the opening of 2–LSA. The step down transformer T–1 is then energized and serves to heat the elements R–1 and R–2. These heating elements 80 comprise a piece of nichrome wire imbedded in a silicone rubber with a fiberglass reinforcement.

Thus, while the machine is in the standby condition, the indium spots 70 in lamps LMP–1 and LMP–2 are heated in order to maintain the lamps in a ready condition so that as soon as the switch 2–LSB is de-energized and the switch 2–LSA energized, the lamps are provided near maximum lumen output.

It will be understood that various changes in details, materials, steps and arrangements of parts, which have been herein described and illustrated in order to explain the nature of the invention, may be made by those skilled in the art within the principle and scope of the invention as expressed in the appended claims. However, while the invention has been described with reference to the structure disclosed herein, it is not to be confined to the details set forth, and this application is intended to cover such modifications or changes as may come within the scope of the following claims.

What is claimed is:
1. In a xerographic reproducing apparatus:
  a xerographic plate mounted for movement,
  a scanning station to hold a document to be reproduced,
  means for moving said xerographic plate relative to the scanning,
  a projection system, mounted in the apparatus to project a radiation image of the document from the scanning station onto said xerographic plate to form an electrostatic latent image thereon,
  at least one lamp having vapor therein positioned adjacent the scanning station for illumination of the document to produce said radiation image,
  said lamp including a vapor control center within the lamp for maintaining proper vapor pressure therein,
  a heating element mounted adjacent said vapor control center to maintain the vapor control center at a given temperature,
  an electrical circuit being connected to a source of electric energy and including said lamp, and said heating element and said means for moving the xerographic plate, and
  means in said circuit for energizing said heating elements when said lamps are de-energized.

References Cited
UNITED STATES PATENTS

| | | | |
|---|---|---|---|
| 2,610,289 | 9/1952 | Brainerd | 240—11.4 |
| 2,617,013 | 11/1952 | Smyth | 240—11.4 |
| 3,099,856 | 8/1963 | Eichorn et al. | 95—1.7 X |
| 3,336,502 | 8/1967 | Gilliatt | 313—109 |

NORTON ANSHER, *Primary Examiner.*

CHARLES E. SMITH, *Assistant Examiner.*

U.S. Cl. X.R.

315—108; 335—11